Oct. 17, 1944.  S. H. McALLISTER ET AL  2,360,700
CATALYTIC CONVERSION PROCESS
Filed Aug. 2, 1941   2 Sheets-Sheet 1
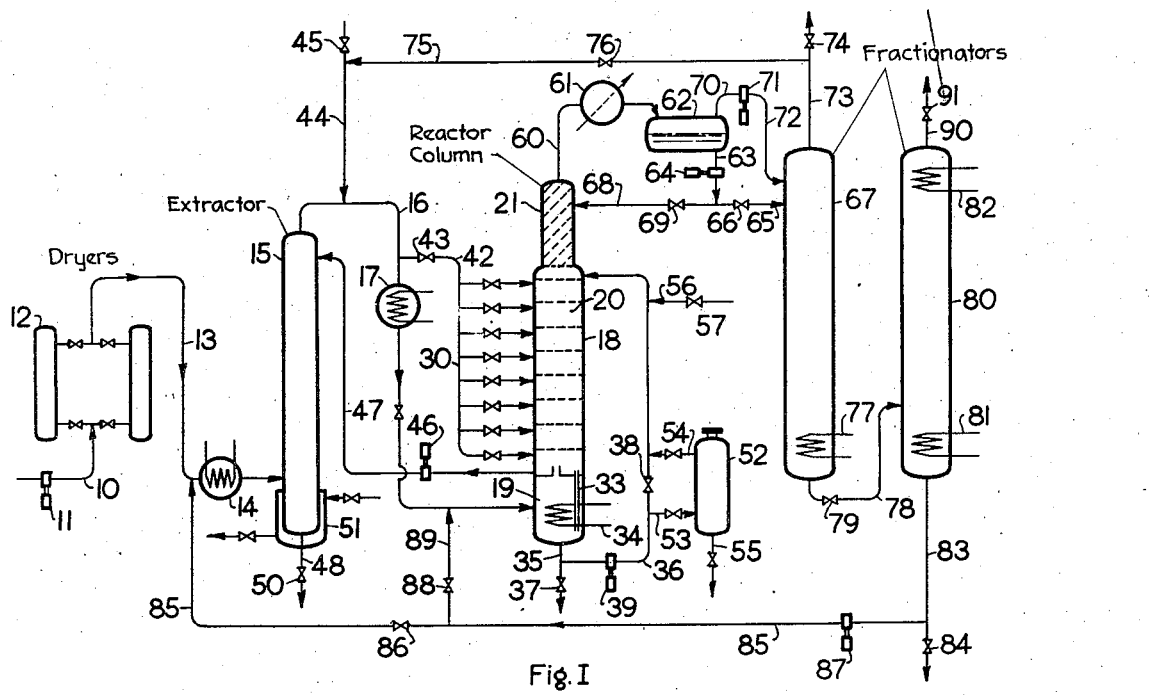
Fig. I
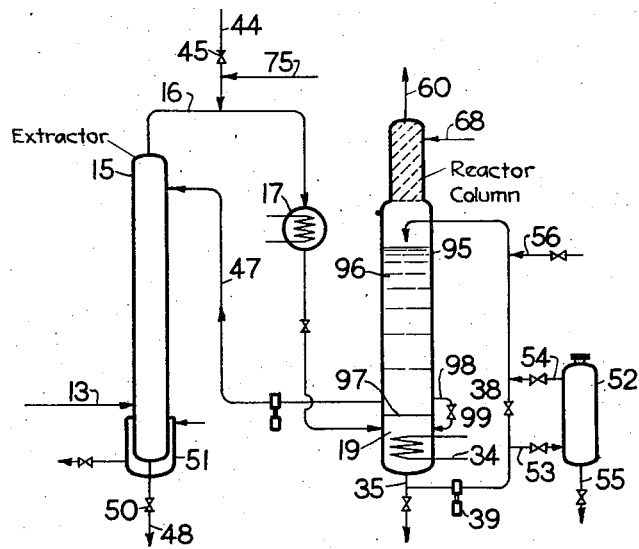
Fig. II
Inventors: Sumner H. McAllister
John Anderson
William E. Ross
By their Attorney:

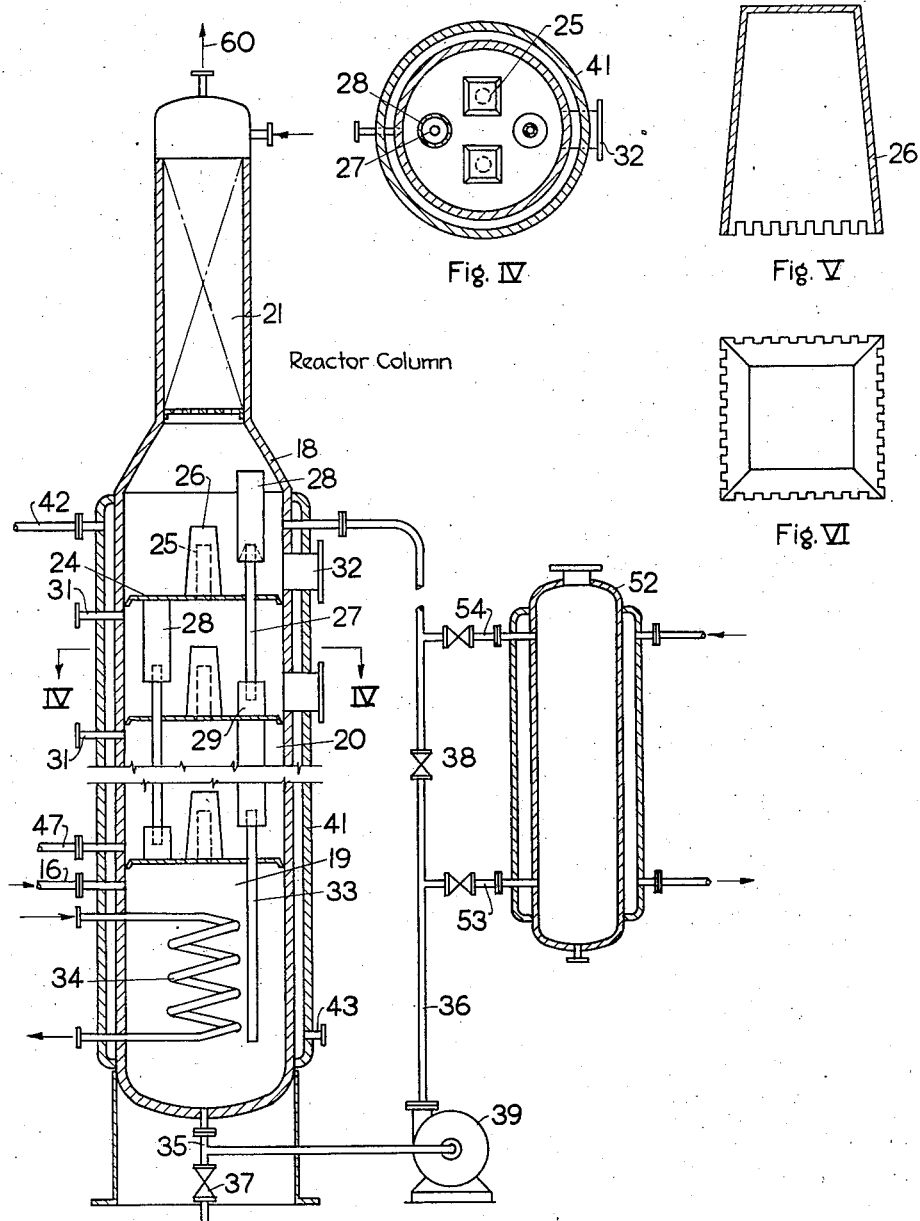

Patented Oct. 17, 1944

2,360,700

UNITED STATES PATENT OFFICE 2,360,700

CATALYTIC CONVERSION PROCESS

Sumner H. McAllister, Lafayette, and John Anderson and William E. Ross, Berkeley, Calif., assignors to Shell Development Company, San Francisco, Calif., a corporation of Delaware Application August 2, 1941, Serial No. 405,204

13 Claims. (Cl. 260—683.5)

The present invention relates to an improved process and apparatus for effecting catalytic conversions in the vapor phase with fluid catalysts. A particular aspect of the invention relates to the execution of catalytic conversions with catalysts of the molten salt type, such in particular as molten salt mixtures comprising metal salts of the Friedel-Crafts type. A still more particular aspect of the invention relates to the vapor phase isomerization of saturated hydrocarbons.

In the majority of processes involving catalytic conversions, the catalyst is employed in a solid state in the form of fragments, pellets, or the like. The use of solid catalysts is quite satisfactory in many cases, but has certain disadvantages such as the difficulty of moving solid catalysts in the reaction zone, poor heat transfer conditions, difficulty of properly contacting catalyst and reactants, the need for large volumes of catalysts, etc., which seriously detract from its suitability, particularly when employing metal halide catalysts. These disadvantages can often be diminished or eliminated by employing the catalyst in the liquid state. This is accomplished in any one of several ways, depending upon the particular catalyst. A common method is to employ the catalyst in the molten state.

It is often impractical, if not impossible, to employ the active catalyst per se in the molten state and a multicomponent catalyst containing one or more modifying agents must therefore be used. Thus, for example, in the case of molten salt catalysts, a plurality of salts are generally combined. By the use of suitable combinations of salts, fusible mixtures which have excellent activity and may be melted to free-flowing liquids at relatively low temperatures may be prepared. Thus, for example, Friedel-Crafts type catalysts, such in particular as aluminum chloride, are only fusible in their pure state at relatively high temperatures, and at such temperatures they act primarily to cause degradation and sludge formation. On the other hand, if their salts are combined with other salts such as the halides of Li, Na, K, Cu, Mg, Zn, Cd, Sn, Pb, As, Sb, Bi, Cr, Mo, Fe, Co, and Ni, excellent multicomponent catalysts which may be used in the form of mobile liquids at temperatures even below 100° C. may be produced. In certain processes, such as isomerization and alkylation of hydrocarbons, a low melting point of the catalyst is important since the reaction equilibrium becomes progressively less favorable as the reaction temperature is increased, and it is therefore desirable to effect the conversion at relatively low temperatures.

The melting point of these multicomponent catalysts is dependent upon their composition. In general, the composition is quite critical and if the catalyst is allowed to deviate from the desired composition the melting point is considerably increased. In the usual operation of processes with such catalysts by prior known methods, it is therefore necessary to operate at a temperature sufficiently above the freezing point of the catalyst to allow for any changes in melting point due to changes in catalyst composition during the process. Changes in the freezing points of the catalysts caused by variations of catalyst composition are not only detrimental in requiring the use of somewhat higher reaction temperatures, but in their effect upon the degree of efficiency with which the catalysts and reactants may be contacted. In all such processes, the efficiency of contact of the reactants and the catalyst is of prime importance since it directly affects the conversion and production capacity. When such low-melting multicomponent catalysts change appreciably in composition during use, the viscosity of the melt increases, and this usually causes a considerable falling-off of the conversion or production capacity.

These various molten catalysts, although highly desirable in many respects, present certain disadvantages when used in the hitherto proposed processes, which have prevented their widespread use. One of these disadvantages has been the excessive cost and difficulty of recovering the catalyst after it is partly or completely spent. This is due to the fact that it is rarely practical to discard the spent catalyst and that the recovery of the valuable components therefrom usually requires withdrawing the molten mixture to a separate recovery unit wherein carbonaceous material is burned out. In most cases it is necessary to follow this operation by a distillation of the catalyst components from the non-volatile material in the catalyst. Aluminum chloride-containing catalysts, for example, when spent, will comprise non-volatile alumina formed by the degradation of aluminum chloride. This requires a separate treatment, usually under vacuum. In the hitherto proposed processes using catalysts of this type, these disadvantages have been greatly aggravated when treating hydrocarbons or other organic materials with catalysts of the Friedel-Crafts type due to the fact that these catalysts are particularly prone to form sludges. The sludges, which are presumably complex compounds comprising side reaction products and Friedel-Crafts halides, quickly become viscous and sticky. Since their accumulation in the reaction zone to any substantial extent causes mechanical difficulties such as pumping problems, line plugging, etc., it has been necessary to withdraw the catalyst from the system long before it is completely spent and subject it to the regeneration treatment.

The object of the present invention is to provide an improved process and apparatus whereby vapor phase catalytic conversions with these fluid catalysts can be effected in a more practical and economical manner, while substantially obviating inherent difficulties of the prior art processes. The process of the present invention not only substantially overcomes these known disadvantages but also allows certain other distinct advantages to be realized.

We have observed that the sludges formed in such processes, notwithstanding the fact that they contain carbonaceous matter, are substantially insoluble in the reactant feed and are, in fact, considerably more insoluble than many of the salt components of the catalysts. We have also observed that in multicomponent catalysts, even though the solubilities of the individual components may be small, they are not equal and, as a result, an appreciable change in catalyst composition can be caused by extraction of the more soluble component or components by liquid reactants. For example, in the case of molten catalysts comprising an excess of $AlCl_3$ dissolved in $LiCl$, $NaCl$, $KCl$, etc., $AlCl_3$ will be extracted selectively from the mixture and, in the case of molten catalysts comprising $AlCl_3$ dissolved in $SbCl_3$, $SnCl_4$, $BiCl_3$, $AsCl_3$, etc., these latter salts are removed at a much faster rate than the $AlCl_3$.

The difficulties heretofore encountered in recovering the spent catalyst are avoided according to the process of the present invention by continuously subjecting a portion of the catalyst to a continuous treatment within the system whereby valuable components of the catalyst are separated from the sludge by an extraction process and continuously returned to the reaction zone. In accordance with the present invention, spent or partly spent catalyst is continuously withdrawn from the reaction zone and extracted with liquid feed to the system whereby at least the more soluble catalyst components are extracted therefrom. The feed comprising recovered catalyst components is heated to effect the separation of material to be treated as a vapor fraction from a liquid fraction comprising the recovered catalyst components, and the resulting vapor and liquid fractions are passed to the reaction zone in separate streams under conditions providing for the maintenance of substantially constant catalyst composition within the reaction zone.

The invention is applicable to a wide variety of catalytic processes wherein materials are contacted in the vapor phase with fluid catalysts of the molten salt type. However, for the purpose of setting forth more clearly the invention, it will be described in detail herein in its application to a specific hydrocarbon conversion, namely the isomerization of saturated hydrocarbons. The following detailed description of the invention is made with reference to the attached drawings forming part of this specification and wherein Figure I shows a more or less diagrammatical elevational section of an improved apparatus suitable for carrying out the process of the invention, Figure II shows a more or less diagrammatical elevational section of a modification of the apparatus shown in Figure I, Figure III shows in detail a cross-section of the reactor column of the apparatus shown in Figure I, Figure IV shows a horizontal section of the reactor tower shown in Figure III, Figure V shows a cross-section in side elevation of a bubble cap of the reactor tower shown in Figure III, and Figure VI shows a plan view of the bubble cap of Figure V.

Identical parts of apparatus are indicated with like reference characters in all figures of the drawings.

Referring to Figure I of the drawings, a saturated hydrocarbon, for example butane, from any suitable source, is forced by means of pump 11 through line 10 into a drying zone. The drying zone may consist of one or more chambers 12 containing a suitable dehydrating material such as, for example, calcium chloride, adsorptive alumina, or the like. From dryer 12, the dried butane stream is passed through line 13, provided with preheater 14, to an intermediate part of an extraction zone. The extraction zone may suitably consist of a column 15, provided with suitable packing material, baffles, or the like. Within extraction zone 15, butane is contacted with spent or partly spent catalyst as described more fully below. Liquid butane, comprising recovered catalyst components, is passed from extraction column 15 through line 16 and heater 17 to a vaporizing zone.

In a preferred embodiment of the invention, the vaporizing zone, a reaction zone and a rectifying zone are comprised in a single combination reactor tower 18. Referring to Figure III, the reactor tower 18 comprises a vaporizer 19 in the lower part thereof, a bubble plate reactor 20 in the intermediate part thereof, and a rectifier 21 in the upper part thereof. A plurality of bubble decks 24 equipped with bubble units are provided within reactor 20. A relatively deep pool of liquid catalyst is maintained upon each bubble deck. A bubble unit of a design permitting the maintenance of a high liquid level upon each deck is therefore provided. A suitable bubble unit having a high vapor riser 25 and means such as a slotted cap 26 for the efficient dispersion of vapors into the catalyst pool is shown in Figures V and VI. Downspouts 27 are provided for the overflow of catalyst from each bubble deck. Although but two bubble units are shown on each deck in the drawings (Figure IV), it is to be understood that a greater number of bubble units, in accordance with the size of the reactor employed, may suitably be used. The overflow lip of the downspouts is provided with baffles such as pipes 28 of larger cross-sectional area than the downspouts. Since the efficient dispersion of the reactants into the catalyst of a type such as molten salts often results in the formation of a foamy mass which occupies a substantial part of the space above the liquid level of the catalyst pool, baffles 28 extend to the bottom of the bubble deck above or are closed in some other manner at their upper end. Similarly, baffles 29 of larger cross-sectional area than the outlets of downspouts 27 are provided about the outlets of the downspouts. Baffles 29 extend from the floor of the bubble deck for a distance well above the outlet end of the downspout to prevent the diversion through the downspout of vapors dispersing from the bubble unit. Means such as inlets 31 are provided for the introduction of cooling fluid above each bubble deck. Manholes 32 permit access into reactor 20 at each bubble deck.

Vaporizer 19 is separated from reactor 20 by the lowest bubble deck of reactor 20. A downspout 33 extends from the lowest bubble deck well into the vaporizer 19 to permit the continuous overflow of catalyst from reactor 20 into vaporizer 19. Evaporator 19 functions as a catalyst accumulator and a supply of fluid catalyst is maintained therein. A heating coil 34 is positioned in evaporator 19 to permit the maintenance of the catalyst at the desired reaction temperature and to vaporize hydrocarbons which may be introduced therein in the liquid phase. Lines 35 and 36, equipped with valves 37 and 38, respectively, and pump 39 are provided for the continuous passage of liquid catalyst from evaporator 19 to the upper part of reactor 20. A continuous flow of liquid catalyst is thus maintained from evaporator 19 to reactor 20 and downwardly through reactor 20 back into vaporizer 19. Rectifier 21, in vapor communication with reactor 20, is preferably packed with suitable tower packing material. A jacket 41 with inlet 42 and outlet 43 is provided about reactor 20 and vaporizer 19. A suitable heating medium such as steam, hot oil, etc., is passed through jacket 41 to aid in maintaining the desired temperature conditions within evaporator 19 and reactor 20.

The above-described reactor containing the molten catalyst in a plurality of spaced pools provides a most efficient means of contacting vaporized reactants and the molten catalyst. In their upward travel through the reactor, the reactants are redispersed in each successive pool of catalyst in the form of small bubbles. It is to be noted that the size of the bubbles of dispersed reactants is substantially constant throughout the reaction zone, thereby avoiding the decrease in effective contact occasioned by an increase in size of the individual bubbles in their upward travel through the catalyst. It is seen that vaporizer 19 of column 18 is utilized to heat the catalyst to reaction temperature, to aid in vaporizing the charge to the reactor, and to separate the recovered catalyst components from the charge. The combination of all of these functions within a single reactor tower 18 minimizes the difficulties heretofore encountered in maintaining a molten mass of catalyst within a well defined temperature range of optimum operating conditions, provides for maximum concentration, and therefore maximum conservation, of heat within the system, and obviates the difficulties and loss of catalyst entailed in the handling of substantial flows of molten catalysts through a plurality of separate units of apparatus. These features of the process lead to a substantial increase in the degree of efficiency and ease of operation with which vapor phase reactions can be effected with the aid of fluid catalysts of the molten salt type.

A wide variety of suitable isomerization catalysts comprising highly active molten salt catalyst mixtures may suitably be used. A very suitable catalyst may comprise, for example, a molten mixture of antimony chloride and aluminum chloride in the approximate proportions of 76 to 97 mol per cent $SbCl_3$ and 24 to 3 mol per cent $AlCl_3$.

Referring again to Figure I, within vaporizer 19 butane vapors are separated from extracted catalyst components. The vapors pass from vaporizer 19 upwardly through the consecutive pools of fluid aluminum chloride-antimony chloride melt within reactor 20, whereby isomerization of butane is effected. The temperature to be maintained within reactor 20 and vaporizer 19 may range from the minimum temperature at which the catalyst may be maintained in the fluid state up to approximately 200° C. A particularly effective temperature may comprise, for example, a temperature in the range of from about 60° C. to about 120° C., depending upon the particular catalyst employed. The reaction temperature is maintained by the heat input in heater 17 and heating coil 34. The pressure to be maintained within reactor column 18 may vary from the minimum superatmospheric pressure required to carry the reactants through the system to any desired superatmospheric pressure, permitting operation in the vapor phase. Maintenance of pressures in the range of from 25 to 500 lbs. gauge, preferably 75 to 125 lbs., within reactor 20 have been found to be suitable. To assist in maintaining the desired temperature within reactor 20, a part of the liquid butane stream emanating from extractor 15 may be bypassed through line 42, provided with valve 43, and through manifold 30 to any one or several points along the length of reactor 20.

The isomerization, when employing catalysts of the above type, is preferably effected in the presence of a hydrogen halide such as hydrogen chloride. This is preferably introduced with the hydrocarbon feed. Hydrogen chloride is therefore drawn from any outside source through line 44, provided with valve 45, leading into line 16. The amount of hydrogen chloride introduced into the system may vary widely in accordance with the nature of the charge, the catalyst composition, and operating conditions. In such cases where it is not desired to recover and recycle the hydrogen halide, minimum quantities, such as from about 0.3% to 5% of the hydrocarbon feed may be employed. When the hydrogen chloride is recycled, however, much larger quantities, for instance up to 25%, of the butane charge may be economically employed. If desired, a limited amount of hydrogen may be introduced with the hydrogen chloride to repress cracking or other undesirable side reactions.

The exceptional suitability of the tower type reactor for the isomerization of butane in the vapor phase with an $SbCl_3$–$AlCl_3$ catalyst melt is shown by the following example:

Normal butane was isomerized in the vapor phase with a catalyst melt consisting of 92.5% of $SbCl_3$ and 7.5% $AlCl_3$ at a temperature of 80° C. and a pressure of approximately 90 lbs. gauge, in a tower type reactor. The normal butane charge was passed into the reactor at a rate of 0.95 to 1 liter per hour, per liter of catalyst space, for a period of 24 hours. Hydrogen chloride was added to the feed in the amount of 4.5% by weight of normal butane treated. An average conversion of butane to isobutane of 46% was obtained. The production rate was 0.450 kg. of isobutane per hour, per liter of catalyst space.

It is seen from the above figures that excellent and sustained yields may be obtained with relatively short period of contact and without recourse to recycling of normal butane.

Spent or partly spent catalyst comprising sludge is withdrawn from the lower part of reactor 20 and forced by means of pump 46 through line 47 into the upper part of column 15, wherein it is contacted with an upward flow of liquid hydrocarbon feed. The rate at which catalyst is withdrawn from reactor 20 and passed to column 15 will vary with operating conditions. Thus, the catalyst may be caused to move downwardly through reactor 20 at such a rate that it will be substantially spent when it reaches the lower part thereof. In such case, catalyst will be passed therefrom to column 15 at a sufficiently rapid rate to substantially avoid the passage of catalyst from reactor 20 directly into vaporizer 19 through line 33. When maintaining a more rapid flow of catalyst through reactor 20, and a flow of catalyst from reactor 20 directly into vaporizer 19 through line 33, it is preferred to effect the passage of partly spent catalyst from reactor 20 to column 15 at a rate sufficiently high to prevent the accumulation of sludge within reactor column 10. During the downward course of the spent or partly spent catalyst through column 15, at least a substantial part of the more soluble salt components contained therein are dissolved in the hydrocarbon feed. The sludge, comprising organic complexes of the Friedel-Crafts catalysts, which is contained in the spent catalyst, is substantially insoluble in the hydrocarbon feed which contributed to its formation and accumulates in the lower part of column 15, whence it is withdrawn. The hydrocarbon charge to the system is preferably preheated to a temperature favorable to the extraction operation. This temperature will vary with the nature of the material being treated and the particular catalyst used. In the present illustrative description of the invention in its application to the isomerization of butane, the butane charge is preferably heated to a suitably elevated temperature, for example in the approximate range of 50° C. to 125° C. and preferably 50° C. to 100° C. A sufficiently high pressure is held within column 15 to maintain at least a substantial part of the hydrocarbon feed introduced therein in the liquid phase. The $SbCl_3$-$AlCl_3$ catalyst of the above-described range of composition is found to possess an appreciable degree of solubility in normal butane in this temperature range. Thus, at 80° C., the solubility of this catalyst in normal butane is found to be in the order of about 7.2% to 7.5% by weight, and the dissolved catalyst material comprises approximately 97% to 99.5% of $SbCl_3$, the remainder of the dissolved material being $AlCl_3$. The sludge, comprising organic aluminum chloride complex compounds present in the spent or partly spent catalyst, is substantially insoluble in the butane and settles to the lower part of column 15, whence it is withdrawn through line 48, controlled by valve 50, and eliminated from the system. The lower part of column 15 is provided with heating means such as, for example, a heating jacket 51 provided with inlet and outlet means for a heating medium such as steam or hot oil to maintain the spent catalyst residue in the fluid state. By judicious control of conditions within column 15, substantially all of the $SbCl_3$ may be extracted from the spent catalyst by the incoming butane feed in a substantially pure state and conveyed in the butane stream through line 16 into vaporizing zone 19. The efficiency of the catalyst recovery step of the invention is illustrated by the following examples:

101.5 grams of spent catalyst obtained in the isomerization of butane with a catalyst melt consisting of 92.5% of $SbCl_3$ and 7.5% of $AlCl_3$ was extracted with 5 portions of normal butane totaling 2.14 kg., at a temperature of 80° C. 83.1 grams of sludge-free catalyst components, 99% of which was $SbCl_3$, was extracted from the spent catalyst.

624 grams of spent catalyst obtained in the isomerization of butane with a catalyst melt consisting of 92.5% of $SbCl_3$ and 7.5% of $AlCl_3$ were extracted at a temperature of 80° C. with 15.5 kg. of normal butane in a continuous operation. The butane was charged to the extractor at the rate of 1000 grams per hour. 604 grams of sludge-free catalyst components were extracted from the spent catalyst, more than 99% of which was found to be $SbCl_3$. The residue consisted essentially of carbonaceous complex compounds and contained only approximately 0.4 grams of antimony.

It is to be noted from these examples that the catalyst components are recovered free of sludge and that the carbon content of the spent catalyst is found in the residual material. It is seen therefrom that but very little of the $AlCl_3$-hydrocarbon complex in the spent catalyst, which renders the use of molten salt catalysts so difficult in the processes used heretofore, remains within the system in the process of the invention. This continuous removal of the $AlCl_3$-hydrocarbon complex from the system not only assures a substantial increase in catalyst life and maintenance of high catalyst activity, but greatly facilitates the handling of the molten catalyst within the system.

Since the catalytic activity and minimum temperature at which the $SbCl_3$-$AlCl_3$ catalyst can be maintained in the fluid state depend upon the catalyst composition, and since $SbCl_3$ is the predominating component of the catalyst, its continuous substantially complete recovery and return to the reaction zone greatly facilitates the maintenance of optimum reaction conditions. Antimony chloride, furthermore, is a relatively costly material and therefore the practical and efficient method for its recovery within the system greatly contributes to the lower cost at which isomerization may be effected by the present process when utilizing a catalyst melt comprising this compound.

At least a part of the heat required to effect the vaporization of the butane feed may be provided by heater 17 and the vaporization completed within vaporizer 19. The recovered antimony chloride is thus separated from the vaporized feed within vaporizer 19 and combined with the catalyst accumulated therein. It is to be noted that the removal of the recovered antimony chloride from the charge before the latter enters the reactor 20 avoids the change in catalyst composition which would occur within reactor 20 by the introduction and consequent accumulation of this component in the lower part thereof. By thus effecting the separation of the recovered antimony chloride within vaporizer 19 of the combination reactor column 18, the disadvantages such as catalyst loss, need for a separate flow of recovered antimony chloride to the reaction zone, increased heat requirements, etc., which are inherent in the use of a separate unit of apparatus for this phase of the process, are avoided.

Sufficient catalyst flowing through line 36 is periodically bypassed through a drum 52 containing aluminum chloride, by means of valved lines 53 and 54 to replace the aluminum chloride used up during the process in the formation of sludge. The fluid catalyst may be drained from the system through valved lines 35 and 55 and passed to suitable catalyst storage means not shown in the drawings, whence it may again be sent into the system through line 56.

Although antimony chloride has but a slight vapor pressure at the reaction temperature, some will nevertheless tend to pass along with the reaction products leaving reactor 20. In order to prevent the loss of this material and avoid the difficulties which result from its presence in the remainder of the system, rectifier 21 packed with suitable packing material is positioned above reactor 20. Sufficient liquid reflux is introduced into the upper part of the rectifier to carry any entrained antimony chloride back to the reactor in solution. Reaction products comprising isobutane, normal butane, and hydrogen chloride pass from rectifier 21 through line 60 and cooler 61 into accumulator 62. In passing through cooler 61, the reaction products are cooled to a temperature sufficiently low to effect the condensation of butanes. Although but a single cooler is shown in the drawings, more than one cooling system and, if desired, a refrigerator system may be used to effect the desired cooling of the reaction products. Liquid is drawn from accumulator 62 through line 63 and forced by means of pump 64 through line 65, provided with valve 66, to a stripping column 67. Part of the liquid drawn from accumulator 62 is forced through line 68 provided with valve 69 as reflux, to the top of rectifier 21. Cooling means not shown in the drawings may be provided to further cool the reflux passing to rectifier 21. Vapors and gases comprising hydrogen chloride are drawn from accumulator 62 through line 70, to compressor 71. From the high pressure side of compressor 71, the compressed stream is passed through line 72 into stripping column 67. Within stripping column 67, a gaseous fraction comprising hydrogen chloride is separated from a liquid fraction comprising isobutane and unreacted butane. A high presure, for example in excess of about 300 lbs., is maintained within column 67 to effect the desired separation. The gaseous fraction comprising hydrogen chloride is eliminated from the top of column 67 through line 73 provided with valve 74, and is recycled at least in part through line 75 provided with valve 76, to line 44. Suitable means such as, for example, a reboiler or heating coil 77 is provided in the bottom of column 67 to effect the desired separation. Liquid comprising isobutane and unreacted butane is withdrawn from the bottom of column 67 and passed through line 78 provided with valve 79, into a fractionator 80. Fractionator 80 is provided with suitable heating means such as, for example, a reboiler or a heating coil 81 in the bottom part thereof, and suitable cooling means such as, for example, a cooling coil 82 in the upper part thereof. Within fractionator 80 a vapor fraction comprising isobutane is separated from a liquid fraction comprising normal butane. Liquid comprising normal butane is withdrawn from fractionator 80 through line 83 provided with valve 84, and eliminated from the system. A part or all of the butane drawn from fractionator 80 through line 83 may be forced through line 85, provided with valve 86, by means of pump 87, into line 13. At least a part of the normal butane thus recycled through line 85 may, by judicious control of valves 86 and 88, be passed through line 89 into line 16, leading into vaporizer 19.

Vapors comprising isobutane are withdrawn overhead from fractionator 80 through line 90, provided with valve 91, as a final product, and passed to conventional condensing and recovery means.

Modifications in the described apparatus may be made within the scope of the invention. Thus, in Figure II there is shown a modified reactor tower 95 which differs from the reactor tower 18 shown in Figure I, in that the reaction section 96 consists of a chamber devoid of bubble trays. The vaporizer 19 is separated from reaction section 96 by means of a porous plate such as, for example, an alundum plate 97, or similar vapor-pervious partition through which the vapors from vaporizer 19 pass into reaction section 96. A line 98 controlled by valve 99 is provided for the passage of catalyst from the lower part of reaction section 96 into the vaporizer 19. Catalyst is continuously drawn from the lower part of reaction section 96 and forced through line 47 to the extractor 15.

Though not shown in the drawings, extractor 15, reactor tower 18 and all lines and drums through which molten catalyst is passed are insulated with suitable insulating means to prevent the loss of heat therefrom by radiation.

Although a molten mixture of aluminum chloride and antimony chloride is chosen in the above illustrative description as a suitable catalyst for the isomerization of butane according to the process of the invention, it is to be understood that the invention is not limited to the use of this particular catalyst and other suitable fluid catalysts may be employed. Thus, suitable isomerization catalysts include molten salt mixtures comprising one or more aluminum halides, such as aluminum chloride and/or aluminum bromide, in admixture with one or more other halides such as, for example, a halide of Li, Na, K, As, Zr, Nb, Mn, Pd, Sn, Sb, Hf, Ta, V, Cb, W, Tl, Pb, Bi, Fe, Co, Ni, S, Se, or Te. A very suitable catalyst comprises a molten mixture of the halides, such as the chlorides of aluminum and antimony and a halide of at least one of the following: Na, K, Zn. Particularly effective catalysts comprise the aluminum halide and the other halides in the ratios of proportions corresponding to or approaching their eutectic mixtures.

The process of the invention is particularly adapted for the isomerization of butane. However, by the inclusion in the charge of suitable agents such as, for example, hydrogen, isobutane, etc., capable of suppressing undesired side reactions such as cracking, polymerization, and the like, the process of the invention may be advantageously employed for the isomerization of higher saturated hydrocarbons, such as pentane, hexane, methyl cyclopentane, etc. These hydrocarbons may be obtained in large quantities as individual compounds in a relatively pure state. The hydrocarbon treated, however, need not necessarily be a pure individual hydrocarbon, but may be a mixture of one or more hydrocarbons. Thus, the invention provides a practical process for converting the normal butane and normal pentane contents of commercial hydrocarbon mixtures such as are obtained from natural gases, petroleum distillates, cracked distillates, etc., to their valuable branched chain isomers. Especially suitable mixtures of hydrocarbons are the so-called butane-butylene fractions and pentaneamylene fractions from which unsaturated hydrocarbons have been substantially removed. Treatment of such mixtures obtained, for instance, as by-products in the sulfuric acid alkylation of isoparaffins, results in materially increasing their contents of branched chain isomers and converting them to suitable raw materials for re-use in the alkylation process. Technical butane and pentane fractions such as those containing from 70% to 98% of the normal isomer and from 2% to 30% of the branched chain isomer may be conveniently treated in accordance with the process of the invention and their content of branched chain isomers materially increased without loss due to decomposition and side reactions. Other mixtures of saturated hydrocarbons such as straight-run gasoline, casing head gasoline, etc., containing appreciable quantities of normal butane, normal pentane, cyclohexane, methyl cyclopentane, or lower-boiling nonbranched saturated hydrocarbons, may be advantageously treated to produce products which are suitable for alkylation of olefines and have superior ignition characteristics.

The hydrocarbon or mixture of hydrocarbons to be isomerized is preferably substantially free of materials which are particularly prone to undergo side reactions such as degradation, polymerization, etc., under the reaction conditions. If desired, excessive quantities of olefines, diolefines, or other detrimental impurities which may be present in the hydrocarbon or hydrocarbon mixture to be treated may be removed by a suitable pretreatment such as by a mineral acid refining, hydrogenation, or the like. However, an important advantage of the process of the invention resides in the fact that column 15 functions as a charge pretreating zone wherein impurities such as unsaturated hydrocarbons are converted in the presence of the spent or partly spent catalyst to materials which are readily eliminated from the system with the sludge withdrawn through line 42. Thus, when butane containing 0.6% by weight of butylene was used as the charge to the extractor wherein spent SbCl₃-AlCl₃ catalyst was being extracted, the butane leaving the extractor was found to contain only 0.004% by weight of olefine, indicating that a practically complete removal of the olefine had been effected.

The process of the invention is in no wise limited to the isomerization of hydrocarbons, but is applicable to a wide variety of processes wherein organic materials are treated in the vapor phase with fluid catalysts comprising normally solid materials or liquids which are higher-boiling than the material being treated. Thus, the process of the invention is particularly applicable to the execution of such processes as alkylation, cracking, polymerization, reforming, desulfurizing, treating, etc., of hydrocarbons wherein the hydrocarbons are contacted in the vapor phase with molten salt mixtures.

We claim as our invention:

1. An isomerization process which comprises contacting a saturated isomerizable hydrocarbon in the vapor phase at isomerizing conditions in a conversion zone with a fluid catalyst melt comprising a halide of antimony and a halide of aluminum, withdrawing a portion of the fluid catalyst melt from said conversion zone, extracting said portion of catalyst with the hydrocarbon to be isomerized, thereby recovering antimony halide therefrom by solution, passing the hydrocarbon comprising dissolved antimony halide to a vaporizing zone, passing catalyst from the conversion zone to the vaporizing zone, separating a vapor fraction comprising the hydrocarbon to be isomerized from a liquid fraction comprising catalyst in said vaporizing zone, passing said vapor fraction and said liquid fraction in separate streams from the vaporizing zone to the conversion zone, and removing reaction products from the conversion zone.

2. An isomerization process which comprises contacting a saturated isomerizable hydrocarbon in the vapor phase at isomerizing conditions in a conversion zone with a fluid catalyst melt comprising a molten salt mixture containing a Friedel-Crafts type catalyst, withdrawing a portion of the fluid catalyst from said conversion zone, extracting said portion of catalyst with the hydrocarbon to be isomerized, thereby dissolving the more soluble catalyst components therefrom, passing the hydrocarbon comprising said dissolved catalyst components to a vaporizing zone, passing catalyst from the conversion zone to the vaporizing zone, separating a vapor fraction comprising the hydrocarbon to be converted from a liquid fraction comprising catalyst in the vaporizing zone, passing said vapor fraction and said liquid fraction in separate streams to the conversion zone, and removing reaction product from the conversion zone.

3. A process in accordance with claim 2 wherein a part of the hydrocarbon comprising dissolved catalyst components is passed to a plurality of intermediate points in the conversion zone.

4. A process for treating hydrocarbons with fluid catalyst melts comprising molten mixtures of halide salts which comprises contacting the hydrocarbon to be converted in the vapor phase with the catalyst under treating conditions in a treating zone, continuously extracting a portion of partly spent catalyst exterior to the treating zone with the hydrocarbon to be treated, thereby dissolving at least a portion of the more soluble catalyst components therefrom, passing the hydrocarbon comprising said dissolved catalyst components to a vaporizing zone, passing catalyst from the treating zone to the vaporizing zone, separating a vapor fraction comprising the hydrocarbon to be treated from a liquid fraction comprising catalyst in the vaporizing zone, passing said vapor fraction and said liquid fraction in separate streams to the treating zone, and removing treated products from the treating zone.

5. A process for the isomerization of butane which comprises passing butane vapors at isomerizing conditions through a plurality of spaced pools of fluid catalyst melt comprising a halide of antimony and a halide of aluminum maintained in a conversion zone, maintaining a downward flow of said fluid catalyst through said conversion zone, withdrawing a portion of the catalyst from said conversion zone, treating the catalyst withdrawn from the conversion zone with butane, thereby extracting antimony halide therefrom, heating the resulting solution to effect the separation of a vapor fraction comprising butane from a liquid fraction comprising antimony halide, passing said vapor fraction into the conversion zone below the pools of catalyst contained therein, and passing said liquid fraction into the conversion zone above the pools of catalyst contained therein.

6. An isomerization process which comprises passing a saturated hydrocarbon vapor at isomerizing conditions through a plurality of spaced pools of fluid catalyst melt comprising antimony chloride and aluminum chloride maintained in a conversion zone, maintaining a downward flow of said fluid catalyst through said conversion zone, withdrawing at least partly spent catalyst from the conversion zone, treating said catalyst withdrawn from the conversion zone with the hydrocarbon to be isomerized, thereby extracting antimony chloride therefrom, heating the resulting solution to effect the separation of a vapor fraction comprising the hydrocarbon to be isomerized from a liquid fraction comprising antimony chloride, passing said vapor fraction into the conversion zone, below the pools of catalyst contained therein, and passing said liquid fraction into the conversion zone above the pools of catalyst contained therein.

7. A hydrocarbon conversion process which comprises passing a saturated hydrocarbon vapor at conversion conditions through a plurality of spaced pools of fluid catalyst melt comprising a Friedel-Crafts type catalyst maintained in a conversion zone, maintaining a downward flow of said fluid catalyst through said conversion zone, withdrawing at least partly spent catalyst from the conversion zone, treating the catalyst withdrawn from the conversion zone with the hydrocarbon to be converted, thereby extracting soluble catalyst components therefrom, heating the resulting solution to effect the separation of a vapor fraction comprising the hydrocarbon to be converted from a liquid fraction comprising the recovered catalyst components, passing said vapor fraction into the conversion zone below the pools of catalyst contained therein, and passing said liquid fraction into the conversion zone above the pools of catalyst contained therein.

8. A hydrocarbon conversion process which comprises passing a saturated hydrocarbon vapor at conversion conditions through a plurality of spaced pools of fluid catalyst melt comprising a molten mixture of halide salts maintained in a conversion zone, maintaining a downward flow of said fluid catalyst through said conversion zone, withdrawing at least partly spent catalyst from the conversion zone, treating the catalyst withdrawn from the conversion zone with the hydrocarbon to be converted, thereby extracting soluble catalyst components therefrom, heating the resulting solution to effect the separation of a vapor fraction comprising the hydrocarbon to be converted from a liquid fraction comprising the recovered catalyst components, passing said vapor fraction into the conversion zone below the pools of catalyst contained therein, and passing said liquid fraction into the conversion zone above the pools of catalyst contained therein.

9. A method for isomerizing butane which comprises contacting butane vapors in a conversion zone under isomerizing conditions with a fluid catalyst melt comprising antimony chloride and aluminum chloride, continuously extracting a portion of partly spent catalyst exterior to the conversion zone with butane, thereby recovering antimony chloride therefrom by solution, heating the resulting solution to effect the separation of a vapor fraction comprising butane from a liquid fraction comprising antimony chloride, and passing said vapor fraction in countercurrent contact with said liquid fraction in the conversion zone.

10. A method for isomerizing hydrocarbons which comprises contacting a saturated isomerizable hydrocarbon in the vapor phase in a conversion zone under isomerizing conditions with a fluid catalyst melt comprising a halide of antimony and a halide of aluminum, continuously extracting a portion of partly spent catalyst exterior to the conversion zone, with the hydrocarbon to be isomerized, thereby recovering antimony halide therefrom by solution, heating the resulting solution to effect the separation of a vapor fraction comprising the hydrocarbon to be isomerized from a liquid fraction comprising antimony halide, and passing said vapor and liquid fractions in separate streams to the conversion zone.

11. A method for isomerizing hydrocarbons which comprises contacting a saturated isomerizable hydrocarbon in the vapor phase in a conversion zone under isomerizing conditions with a fluid catalyst melt comprising a Friedel-Crafts type catalyst, continuously extracting a portion of partly spent fluid catalyst exterior to the conversion zone with the hydrocarbon to be isomerized, thereby dissolving at least a portion of the more soluble catalyst components therefrom, heating the resulting solution to effect the separation of a vapor fraction comprising the hydrocarbon to be isomerized from a liquid fraction comprising said catalyst components, and passing said vapor and liquid fractions in separate streams to the conversion zone.

12. A method for treating hydrocarbons with fluid catalyst melts comprising Friedel-Crafts type catalysts which comprises contacting the hydrocarbon in the vapor phase with the catalyst melt under conversion conditions in a conversion zone, continuously extracting a portion of partly spent fluid catalyst exterior to the conversion zone with the hydrocarbon to be treated, thereby dissolving at least a portion of the more soluble catalyst components therefrom, heating the resulting solution to effect the separation of a vapor fraction comprising the hydrocarbon to be treated from a liquid fraction comprising said catalyst components, and passing said vapor and liquid fractions in separate streams to the conversion zone.

13. A method for treating hydrocarbons with fluid catalyst melts comprising molten mixtures of halide salts which comprises contacting the hydrocarbon to be treated in the vapor phase with the catalyst under conversion conditions in a conversion zone, continuously extracting a portion of partly spent fluid catalyst exterior to the conversion zone with the hydrocarbon to be treated, thereby dissolving at least a portion of the more soluble catalyst components therefrom, heating the resulting solution to effect the separation of a vapor fraction comprising the hydrocarbon to be treated from a liquid fraction comprising said catalyst components, and passing said vapor and liquid fractions in separate streams to the conversion zone.

SUMNER H. McALLISTER.
JOHN ANDERSON.
WILLIAM E. ROSS.